(12) United States Patent
Anderson et al.

(10) Patent No.: US 8,752,810 B2
(45) Date of Patent: Jun. 17, 2014

(54) LOCKABLE FLUID STRUT WITH FRANGIBLE LOCK

(75) Inventors: Ryan T. Anderson, Grand Rapids, MI (US); Troy A. Waterman, Ionia, MI (US); Kevin Thomas Braat, Portage, MI (US)

(73) Assignee: Suspa Incorporated, Grand Rapids, MI (US)

( * ) Notice: Subject to any disclaimer, the term of this patent is extended or adjusted under 35 U.S.C. 154(b) by 166 days.

(21) Appl. No.: 13/297,775

(22) Filed: Nov. 16, 2011

(65) Prior Publication Data

US 2013/0119590 A1    May 16, 2013

(51) Int. Cl.
 *F16F 9/56*    (2006.01)
(52) U.S. Cl.
 USPC ......... 267/124; 267/64.12; 188/376; 188/300
(58) Field of Classification Search
 CPC ........... E05F 3/221; F16F 9/0254; F16F 9/56; F16F 7/126
 USPC ......... 267/64.12, 124; 248/408; 188/376, 300
 See application file for complete search history.

(56) References Cited

U.S. PATENT DOCUMENTS

| | | | |
|---|---|---|---|
| 3,430,456 A | 3/1969 | Stricker | |
| 3,756,186 A | 9/1973 | Nordling | |
| 4,043,253 A | 8/1977 | Albright et al. | |
| 4,113,221 A | 9/1978 | Wehner | |
| 4,165,854 A | 8/1979 | Duly | |
| 4,317,387 A | 3/1982 | Myers et al. | |
| 4,339,148 A | 7/1982 | Smith et al. | |
| 4,382,311 A | 5/1983 | Watts | |
| 4,602,890 A | 7/1986 | Duda | |
| 4,635,327 A | 1/1987 | Netznik | |
| 4,807,855 A | 2/1989 | Schuitema | |
| 4,811,983 A | 3/1989 | Watts et al. | |
| 5,165,818 A | 11/1992 | Newhart | |
| 5,215,291 A | 6/1993 | Bauer et al. | |
| 5,335,949 A | 8/1994 | Maury et al. | |
| 5,538,117 A * | 7/1996 | Bouchez | 188/371 |
| 5,579,875 A | 12/1996 | Vargas et al. | |

(Continued)

FOREIGN PATENT DOCUMENTS

DE   9319800 U1 *  8/1994
GB   2160292 A  * 12/1985

OTHER PUBLICATIONS

US Publication No. 2007/0003361 entitled Locking Device for a Telescopic Tube, published Jan. 4, 2007, to Wang.

*Primary Examiner* — Anna Momper
(74) *Attorney, Agent, or Firm* — Price Heneveld LLP

(57) ABSTRACT

A fluid strut includes a frangible locking member including a generally cylindrical locking pin mounted to an outer cylindrical housing of the strut and extending radially inwardly toward a gas spring cylinder. The locking pin is movable between operative and inoperative positions. In the operative position, the spring-loaded frangible locking pin extends into engagement with the gas cylinder and can advance radially to a locking position once the outer housing extends beyond the location of the gas cylinder. In an inoperative position, the locking pin is held in a retracted position. The end of the locking pin has a reduced diameter, such that, if a purposeful force is placed upon the strut when in a locked position, the pin can shear, allowing the rod to be retracted within the cylinder and the closure member to be closed without damage.

26 Claims, 7 Drawing Sheets

(56) References Cited

U.S. PATENT DOCUMENTS

| | | |
|---|---|---|
| 5,950,997 A | 9/1999 | Metz |
| 6,546,596 B2 | 4/2003 | Grote et al. |
| 6,952,940 B2 | 10/2005 | Molzer et al. |
| 7,036,797 B2 | 5/2006 | Liu |
| 7,198,306 B2 | 4/2007 | Ambs |
| 7,364,533 B2 | 4/2008 | Baker |
| 7,387,181 B2 | 6/2008 | Adoline et al. |
| 7,412,753 B2 | 8/2008 | Osborne et al. |
| RE40,657 E | 3/2009 | Suh |
| 7,559,565 B2 | 7/2009 | Nakamura |
| 7,654,371 B1 | 2/2010 | Metz et al. |
| 7,681,285 B2 | 3/2010 | Hua |
| 7,975,359 B2 | 7/2011 | Osborne et al. |
| 7,980,519 B2 | 7/2011 | Chen |

\* cited by examiner

LOCKABLE FLUID STRUT WITH FRANGIBLE LOCK

BACKGROUND OF THE INVENTION

The present invention relates to a fluid strut, such as a gas spring, which can be locked in an extended position with a frangible or breakaway plunger-type lock.

Fluid struts, also known as gas springs or cylinders, are frequently employed to assist in the opening and holding open of closures, covers, or lids for a variety of products, including vehicle hoods, hatchback lids, trunk lids, and, in some cases, doors. Their use facilitates the opening and holding open of such devices. They have found application in a variety of fields, including storage trunks in vessels, such as power boats, storage and office cabinets and lockers, and other environments in which relatively heavy closure doors are required to be opened easily and maintained in an open position. In some applications where the closure member is relatively heavy, for additional safety, it is desired to lock the strut in a mechanically locked position to prevent any accidental closure of the cover when accessing the storage or other compartment to which the closure member is attached.

U.S. Pat. No. 4,807,855 discloses one locking approach in which a spring-loaded plunger lock is employed to automatically lock the gas strut rod when in an extended position, preventing the inadvertent collapsing of the gas strut when in an extended position. Although this provides the desired safety feature, in the event the user inadvertently or otherwise fails to remove the lock and slams the cover, such as a vehicle hood, trunk lid, or the like, downwardly against the locking pressure, serious damage can occur to the structural part of the vehicle or other closure member involved.

Accordingly, there is a need for a strut system in which the strut can be locked in a fully open or extended position, preventing inadvertent closure of a closure member with which the strut is employed. The system should allow, upon application of a closing force above a certain level, the strut to overcome the locking feature and allow closure of the covered compartment without damage to the closure member.

SUMMARY OF THE INVENTION

The system of the present invention provides such an advantageous feature for a fluid strut, such as a gas assist spring, which includes a locking mechanism that can be moved between operative or inoperative positions. When in an operative position, a plunger lock on a housing concentric with a gas cylinder engages the gas cylinder when in an extended position for holding the strut in an open position. The plunger lock is designed with a reduced sized locking element, which is subject to being sheared if, when in a locked position, a predetermined force is placed on the closure member and strut, thereby allowing the closure member to close if a purposeful closing action is applied.

In a preferred embodiment of the invention, the frangible locking member comprises a spring-loaded plunger-type lock having a generally cylindrical pin mounted to an outer cylindrical housing of the strut assembly and extending radially inwardly toward the gas spring cylinder. The outer cylindrical housing is concentric with the gas spring cylinder, allowing the two members to slide with respect to one another as the rod extends from the gas cylinder to extend the cylindrical housing, assisting in the opening and closing of a cover, such as a vehicle hood, trunk, door, or other relatively heavy closure member in different environments. The spring-loaded frangible locking member comprises a generally cylindrical pin secured by a mounting bracket to the outer cylindrical housing and movable between operative and inoperative positions. In the operative position, the spring-loaded frangible locking pin extends into engagement with the gas cylinder and can advance radially to a locking position once the outer housing extends to a predetermined position with respect to the gas cylinder. In an inoperative position, the locking pin is held in a retracted position.

In the most preferred embodiment of the invention, the end of the locking pin associated with the frangible locking member has a reduced diameter, such that, if a purposeful force is placed upon the strut when in a locked position with the locking pin engaging the end of the gas cylinder, the pin can shear, allowing the rod to be retracted within the cylinder and the closure member to be closed without damage.

Thus, the frangible locking assembly of the present invention provides important features over the prior art, including the ability to position the locking member in an inoperative position when not desired to be used or in an operative position in which it automatically locks under spring force to hold the strut in an open position unless or until a purposeful closing force is applied by an individual, in which case the locking pin shears and allows the strut to collapse, allowing the closure member to close.

These and other features, objects and advantages of the present invention will become apparent upon reading the following description thereof together with reference to the accompanying drawings.

DETAILED DESCRIPTION OF THE PREFERRED EMBODIMENT

Figure 1:
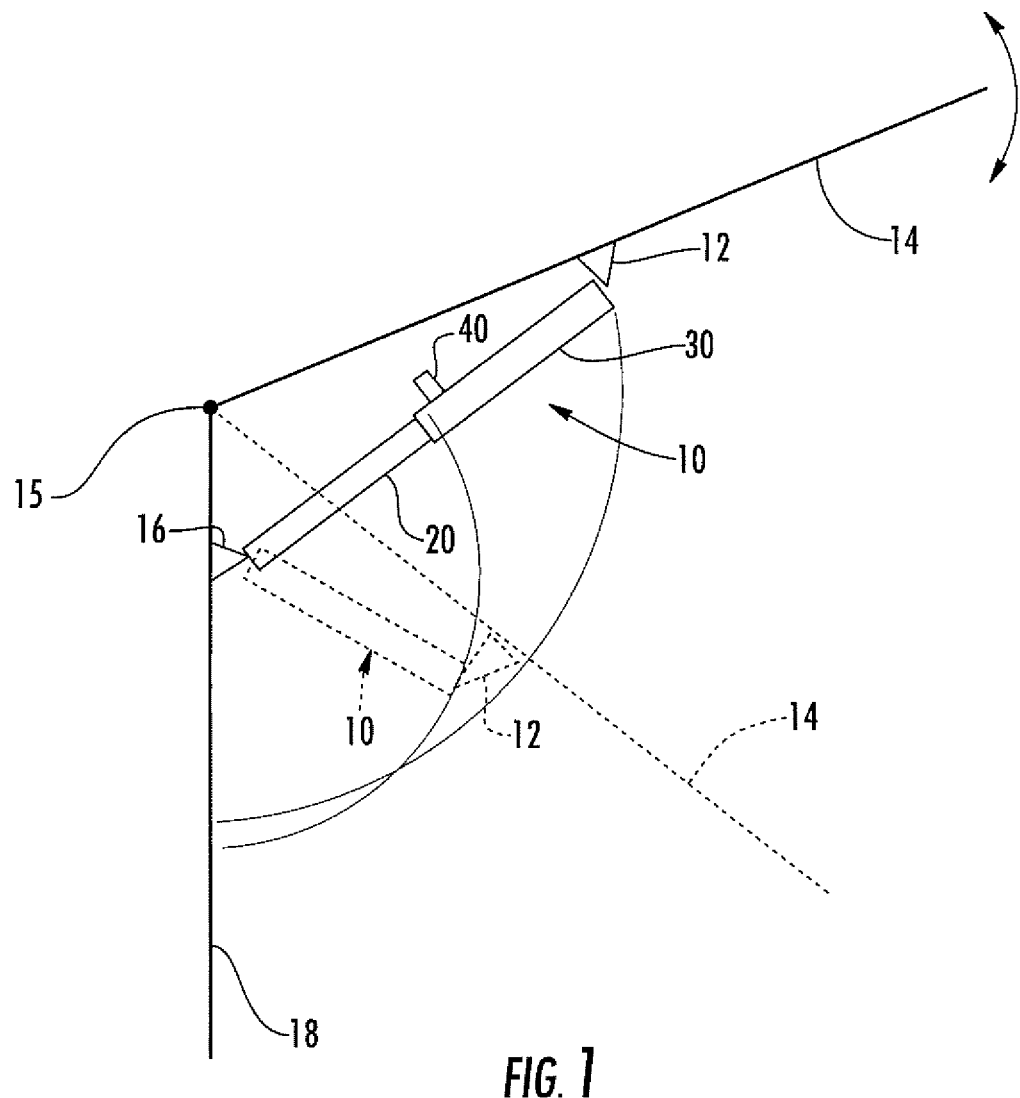
FIG. 1 is a schematic diagram of the installation of a fluid strut embodying the locking system of the present invention.
Figure 2:
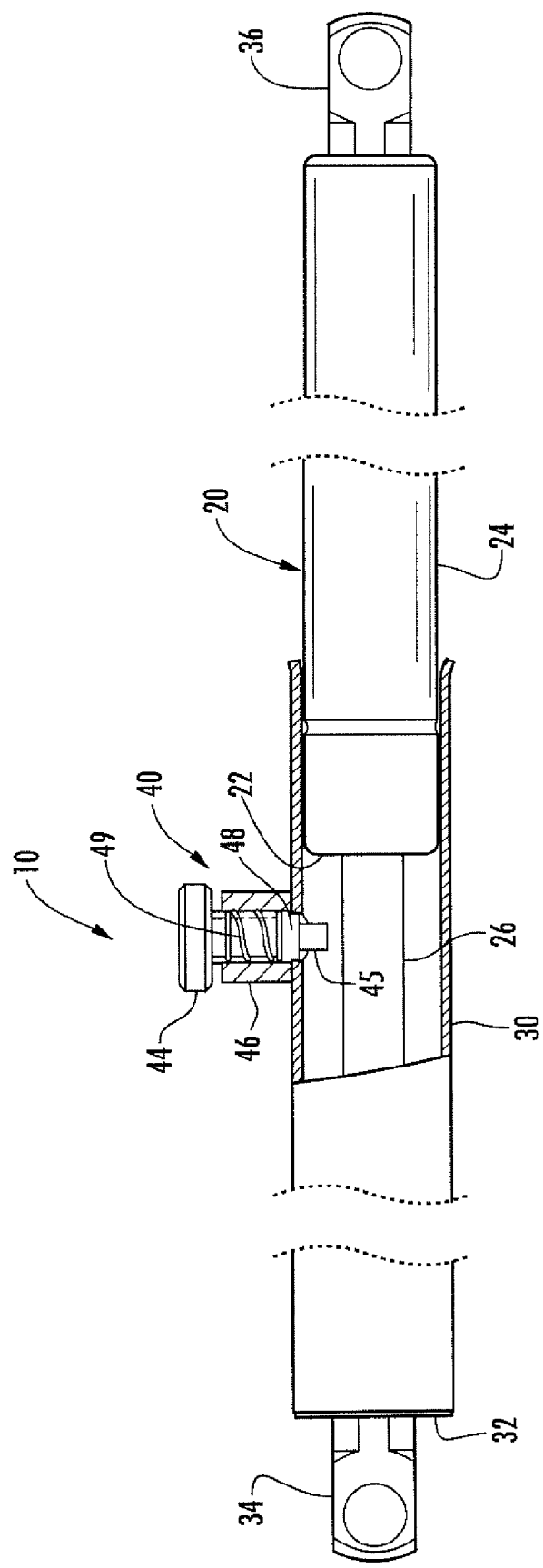
FIG. 2 is a side elevational view, partly in cross section and partly broken away, of the fluid strut including the locking assembly of the present invention.

Referring initially to FIGS. 1 and 2, there is shown in FIG. 1 a typical installation of a fluid strut embodying the present invention. The fluid strut 10 includes a gas spring or damper 20 (FIG. 2) concentrically surrounded by an outer housing 30 with a locking assembly 40 mounted to housing 30 and selectively engaging end 22 of gas spring cylinder 24 as discussed below. In the preferred embodiment, housing 30 is cylindrical. The strut 10 is typically mounted by mounting brackets, such as bracket 12 mounted to a closure member 14 and bracket 16 mounted to a member 18, such as the frame of a compartment, which is substantially enclosed by closure member 14. The schematic view of FIG. 1 illustrates the movement of closure member 14 between a fully open position, shown in solid lines, to a closed position, shown in phantom lines, in which the fluid strut and in particular the cylindrical housing 30 collapses over the cylinder 24 when the locking assembly 40 is in an unlocked position. The closure member 14 can be a hood lid, trunk lid, door, or other closure member for vehicle applications; a cabinet cover, door, or other closure member in storage applications; and is coupled by a hinge 15 to member 18 to be enclosed. It is understood that the schematic diagram of FIG. 1 does not illustrate the exact structure of the closing member 14 or member 18, it being understood that they are substantially conventional in design, as is the mounting of the fluid strut 10 to members 14 and 18.

In FIG. 2, the lockable fluid strut 10 includes a gas spring 20 having a pressurized cylinder 24 with an internal piston coupled to an extendable piston rod 26 having its projecting end secured to the end cap 32 of the concentric cylindrical housing 30. Cylindrical housing 30 is, therefore, moved by the movement of piston rod 26 between a fully collapsed position (not shown) in which end 32 is substantially adjacent end 22 of gas cylinder 24 and a fully extended position shown in FIG. 2. The fluid strut 10 includes a clevis-type mount 34, such as an A13 to A20 or B13 to B20 clevis available from Suspa, Incorporated, at end 32. Clevis 34 may be threaded onto a threaded end of piston rod 26. The end of gas cylinder 24 opposite piston rod 26 includes a similar clevis mount 36 for attaching the fluid strut 10 to suitable mating mounting brackets 12 and 16, shown in FIG. 1.

Gas spring 20 can be manufactured to provide a selected force for a given application. Typically the pressurized gas within cylinder 24 urges piston rod 26 outwardly to a fully extended position for assisting in opening a closure member 14 and holding the closure member 14 in an open position until the user manually moves the closure member to a closed position. Thus, depending on the application, the spring force provided by the selected gas spring provides the desired opening and holding forces. In some applications, however, it is desired to assure that the gas spring remains in an open position by providing a locking mechanism, such as described in U.S. Pat. No. 4,807,855, entitled GAS CYLINDER PLUNGER LOCK, issued on Feb. 28, 1989, the disclosure of which is incorporated herein by reference. In some applications, however, it would also be desirable to have such a locking mechanism in a selectable inoperative position, such that the user can select whether or not the locking mechanism will be active. In other applications where the locking mechanism is active, it would also be desirable to prevent an excessive force from causing damage to the closure member 14 when the locking mechanism is in a locked position. The locking assembly 40 of the present invention accommodates these additional dual functions for a locking mechanism as now described in greater detail in connection with FIGS. 3-7.

Figure 3:
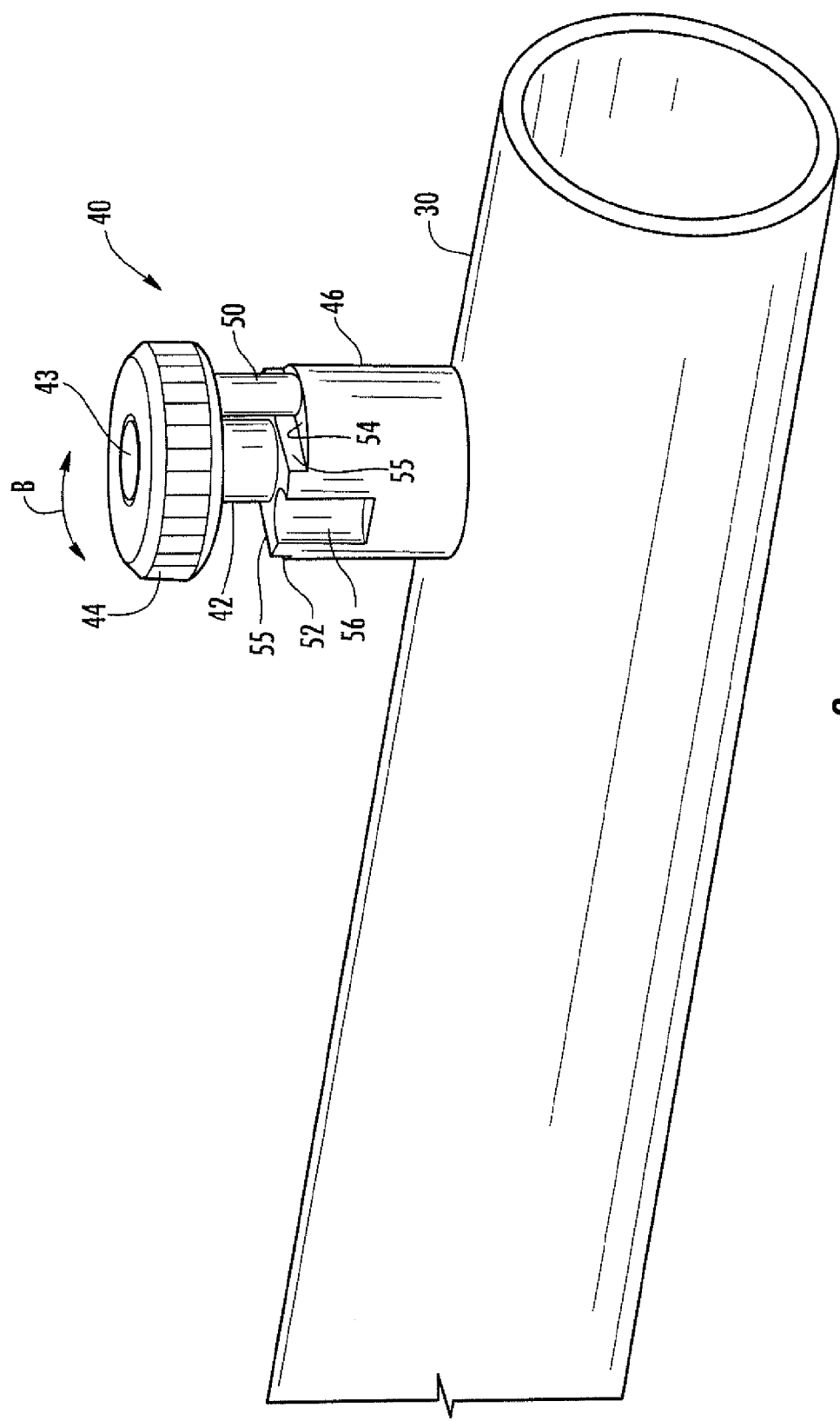
FIG. 3 is an enlarged fragmentary perspective view of the locking assembly shown in an unlocked position.
Figure 4:
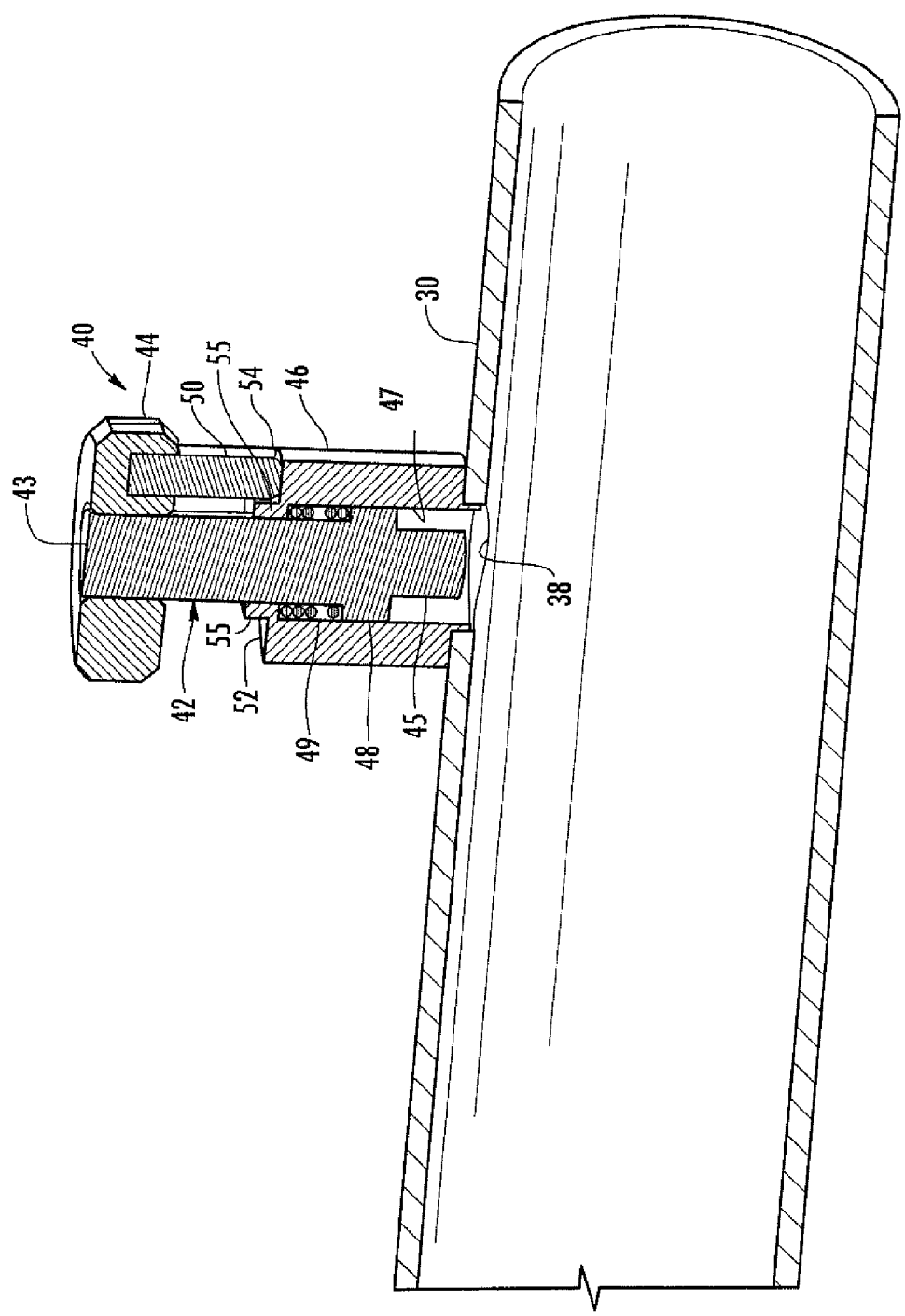
FIG. 4 is an enlarged cross-sectional view of the structure shown in FIG. 3.
Figure 5:
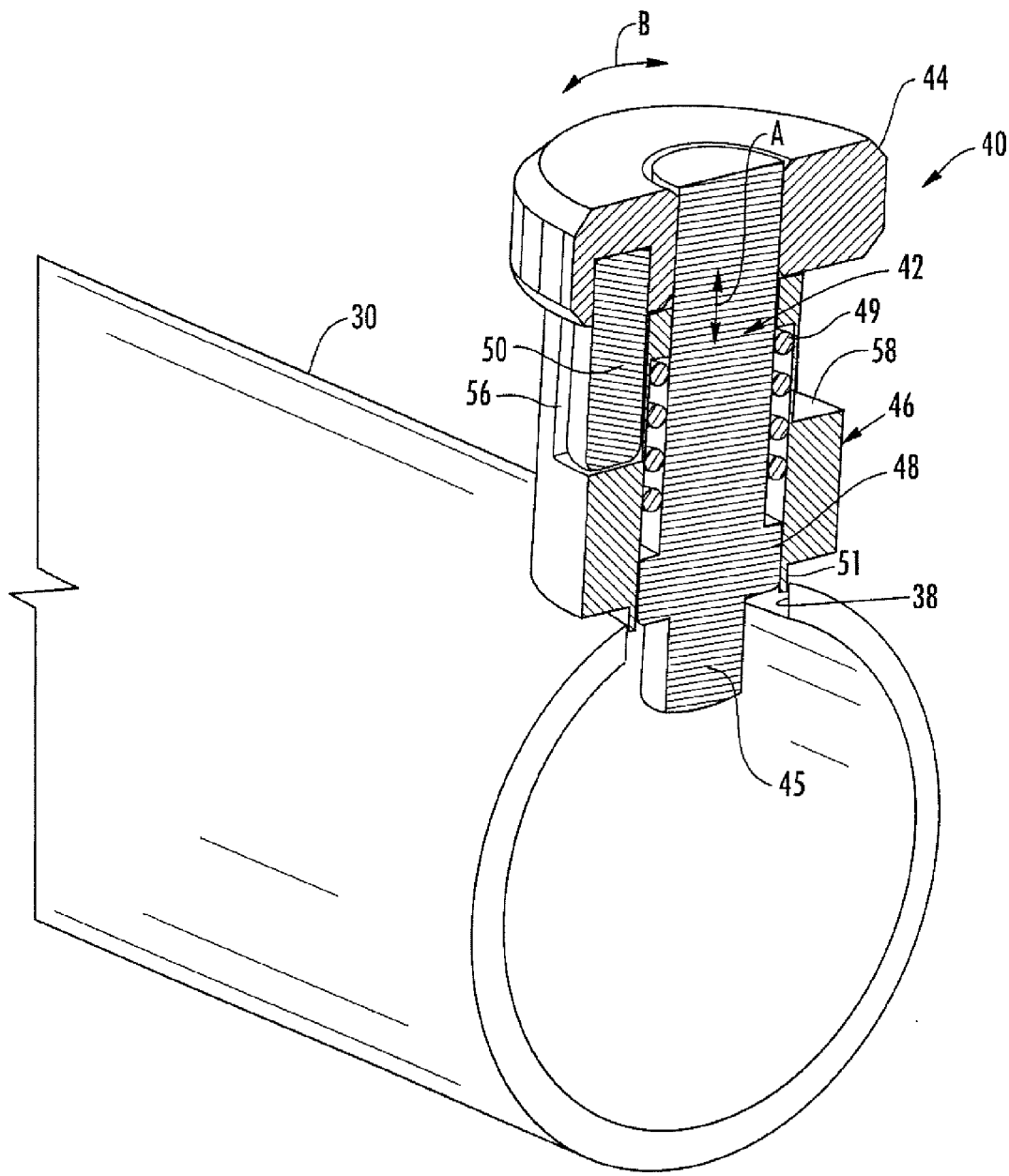
FIG. 5 is an enlarged cross-sectional view of the structure shown in FIGS. 3 and 4, shown with the locking member in a locked position.
Figure 6:
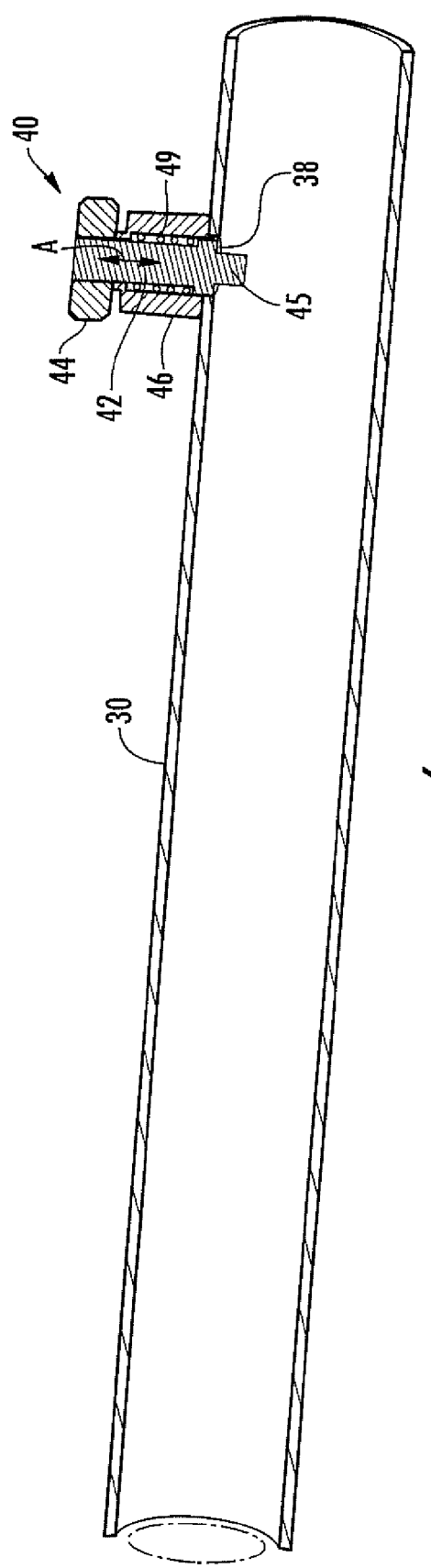
FIG. 6 is a longitudinal cross-sectional view of the structure shown in FIG. 5.

The locking assembly 40 is shown in an inoperative locking pin retracted position in FIGS. 3 and 4 and in an operative locking position in FIGS. 5 and 6. The locking assembly, as best seen initially in FIGS. 3 and 4, includes locking pin 42 having one end 43 secured to a knurled control knob 44. The generally cylindrical locking pin is spring-loaded and slideable with respect to a mounting bracket 46 secured to the outer cylindrical wall of cylindrical housing 30. The mounting bracket 46 is secured to housing 30 by means of a cylindrical collar 51 which extends within aperture 38, as best seen in FIGS. 4 and 5. Mounting bracket 46 is typically welded or otherwise secured to cylindrical housing 30 in a conventional manner. Bracket 46 positions the generally cylindrical pin 42 in alignment with an aperture 38 in cylinder 30, as illustrated in FIGS. 4-6, such that the pin can extend into the cylinder, as illustrated in FIGS. 5 and 6, when in a locked position. Mounting bracket 46 is generally cylindrical and includes a central cylindrical bore 47 which receives an enlarged annular slide 48 integral with pin 42 to control the movement of the pin within bore 47. An end 45 of pin 42 comprises a frangible locking member which, as described below, can be sheared in the event the locking pin is in a locked position, as shown in FIGS. 5 and 6. If a purposeful closing force is placed on the strut 20 that could damage the closure member, end 22 (FIG. 2) of cylinder 24 engages end 45 of the locking pin 42 with sufficient force to cause it to shear. This allows the strut 20 to collapse, allowing closing of the closure member 14 with respect to member 18 (FIG. 1).

The mounting bracket 46 includes, above slide 48, a compression spring 49 which urges pin 42 downwardly toward a locked position when in an operative position, as seen in FIGS. 5 and 6. In order to hold the locking pin in an inoperative position, knob 44 includes an indexing pin 50 which engages chord-shaped lands 52 or 54 on the upper surface of bracket 46, as seen in FIGS. 3 and 4. The lands are bordered by a shoulder 55 holding indexing pin 50 in the retracted position, as best illustrated in FIGS. 3 and 4, against the force of spring 49. The raising and rotation of knob 44 permits the placement of the indexing pin 50 on either of the 180° spaced lands 52 or 54 for holding the locking assembly 40 in an inoperative position.

If it is desired to allow the locking pin 42 to move to a locking position, the knob is raised against the force of spring 49 and rotated 90° from the position shown in FIGS. 3 and 4, such that pin 50 can move downwardly within one of the semicircular, radially extending recesses 56 and 58 on either side of the mounting bracket 46, thereby allowing locking pin 42 to move radially, in a direction indicated by arrow A in FIGS. 5 and 6. In the locked position, the reduced diameter end 45 of locking pin 42 extends within aperture 38 of cylindrical housing 30 for engaging end 22 of cylinder 24, thereby holding the cylindrical housing 30 in an extended position with respect to cylinder 24, and, therefore, closure member 14 in an open position, as shown in solid lines in FIG. 1. The spring constant associated with spring 49 is selected to provide a sufficient radial force for locking pin 42 to move through aperture 38 when in an operative position to ride along the outer cylindrical surface of cylinder 24 without causing damage to the cylinder and, once in the cleared position shown in FIG. 2, extend into the inner cylindrical cavity of housing 30, such that it will engage and obstruct the collapsing of strut 10 by engaging end 22 of cylinder 24. Thus, by rotating knob 44 in the direction as indicated by arrow B in FIGS. 3 and 5, the locking assembly 40 can be moved between an inoperative position, shown in FIGS. 3 and 4, to an operative position, shown in FIGS. 5 and 6, allowing locking pin 42 to move radially into cylindrical housing 30, providing an effective lock holding the strut 10 in an extended position.

Figure 7:
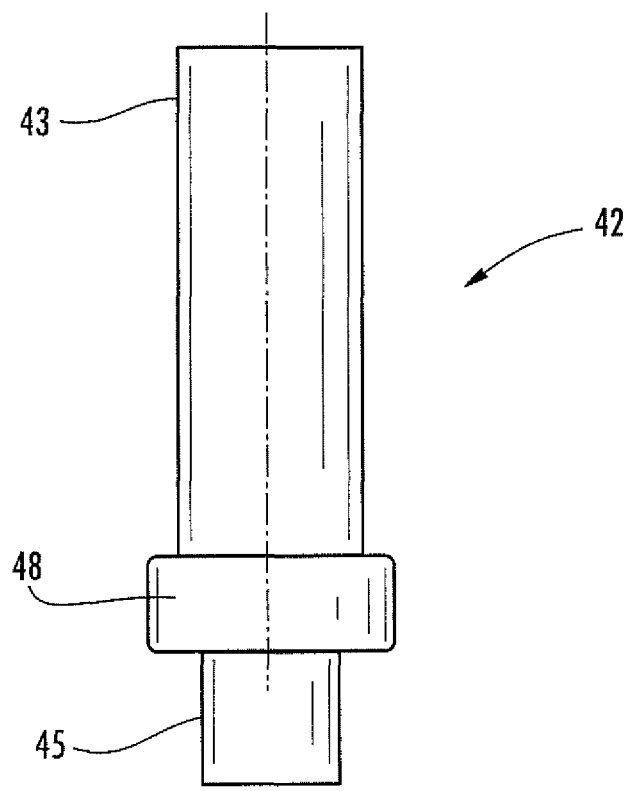
FIG. 7 is a side elevational view of the locking pin employed in connection with the locking member of the present invention.

In one embodiment of the invention, the locking pin 42, which is shown in detail in FIG. 7, had an overall length of from about 23.65 mm to about 24 mm. The upper end 43 has a diameter of from about 5.91 mm to about 5.98 mm, while the slide section 48 has a diameter of from about 7.9 mm to about 7.98 mm. The frangible locking end 45 had a reduced diameter of about 4.41 mm±0.13 mm and a vertical height of about 4.5 mm, such that it extends within cylindrical housing 30 a distance sufficient to engage end 22 of cylinder 20, holding the strut in an extended position for holding the enclosed holding member open, as seen in solid lines in FIG. 1. The locking pin 42 is made of a suitable zinc-plated AISI 12L14 steel and, for the dimensions given above, has a shear strength of about 1000 pounds±125 pounds. The dimensions and shear strength of the end 45 of locking pin 42 can be selected for a particular application taking into consideration the leverage provided by the closure member length verses the positioning of the strut with respect to the hinge 15 as seen in FIG. 1. Thus, for some applications, a lower shear strength may be desirable and in other applications a higher shearing force may be desired. This is accomplished by changing the diameter of the end 45, which is a second order function with respect to the resulting shear force required for shearing the frangible locking end 45.

Thus, with the frangible locking system of the present invention which can be moved between inoperative and operative positions, the user can select whether or not the locking feature is to be employed and, if it is, it can be overridden in the event of a purposeful closing action being applied to the closure member against the strut. The invention may also be used with a gas spring or hydraulic damper. Further, it may be used with a rod that normally retracts within the cylinder. It will become apparent to those skilled in the art that various modifications to the preferred embodiment of the invention as described herein can be made without departing from the spirit or scope of the invention as defined by the appended claims.

The invention claimed is:

1. A strut with a frangible lock comprising:
    a fluid spring including a cylinder and a rod extendable therefrom;
    a housing concentrically surrounding said cylinder and coupled to said rod for movement along an axis of said cylinder; and
    a frangible locking pin having a first end and a second end with said first end having a reduced diameter and extending between said housing and said fluid spring for holding said rod in a fixed position with respect to said cylinder, said reduced diameter first end breaking to allow said rod to move with respect to said cylinder when a predetermined axial force is applied to said rod.

2. The strut as defined in claim 1 wherein said fluid spring is a gas spring.

3. The strut as defined in claim 1 wherein said locking n is a spring-biased locking pin extending radially between said housing and said fluid spring.

4. The strut as defined in claim 3 wherein said housing includes an aperture adjacent one end thereof and further including a mounting bracket secured to said housing in alignment with said aperture.

5. The strut as defined in claim 4 wherein said locking pin is slideably positioned in said mounting bracket to selectively extend through said aperture to engage said cylinder for holding said rod in a position extended from said cylinder.

6. The strut as defined in claim a wherein said locking pin includes a knob at one end for rotating said locking pin with respect to said mounting bracket for selectively holding said locking pin in one of an operative and an inoperative position.

7. The strut as defined in claim 6 wherein said knob includes an indexing pin extending between said knob and said mounting bracket for selectively holding said locking pin away from said rod when in an inoperative position.

8. The strut as defined in claim 7 wherein said mounting bracket includes at least one land having a shoulder for holding said indexing pin in a position to maintain said locking pin in a retracted inoperative position.

9. The strut as defined in claim 8 wherein said mounting bracket includes a pin-receiving groove extending radially toward said housing, wherein said groove is angularly offset from said land such that, as said knob is rotated, said indexing pin moves from a position aligned with said land to a position aligned with said groove to allow said locking pin to extend through said aperture in said housing for engaging said cylinder to hold said rod in an extended position when said aperture is axially aligned with said rod in a position remote from said cylinder.

10. A lockable strut extending between a closure member and a compartment, said strut comprising:
    a gas spring including a pressurized cylinder having a longitudinal axis and a rod extending from said cylinder along said axis;
    a cylindrical housing concentrically surrounding said pressurized cylinder and coupled to said rod for movement parallel to the axis of said cylinder;
    a fitting at an end of said pressurized cylinder opposite said rod for coupling said pressurized cylinder to one of a closure member and a compartment;
    a second fitting at an end of said cylindrical housing opposite said first named fitting for coupling said cylindrical housing to the other of a closure member and a compartment; and
    a spring-loaded locking pin extending between said cylindrical housing and said pressurized cylinder for holding said rod in a position extended from said pressurized cylinder, said locking pin including a frangible end which shears and allows said rod to retract within said cylinder when a predetermined axial force is applied to said rod in a direction to retract said rod.

11. The strut as defined in claim 10 wherein said locking pin extends radially between said cylindrical housing and said pressurized cylinder.

12. The strut as defined in claim 11 wherein said cylindrical housing includes an aperture near an end overlying said pressurized cylinder and further including a mounting bracket secured to said cylindrical housing in alignment with said aperture.

13. The strut as defined in claim 12 wherein said locking pin is slideably positioned in said mounting bracket to selectively extend through said aperture to engage an end of said pressurized cylinder for holding said rod in an extended position.

14. The strut as defined in claim 13 wherein said locking pin includes a knob at one end for rotating said locking pin with respect to said mounting bracket for selectively holding said locking pin in one of an operative and an inoperative position.

15. The strut as defined in claim 14 wherein said knob includes an indexing pin extending between said knob and said mounting bracket for selectively retracting said locking pin when in an inoperative position.

16. The strut as defined in claim 15 wherein said mounting bracket includes at least one land having a shoulder for holding said indexing pin in a position to maintain said locking pin in a retracted inoperative position.

17. The strut as defined in claim 16 wherein said mounting bracket includes a pin-receiving groove extending radially toward said cylindrical housing, wherein said groove is angularly offset from said land such that, as said knob is rotated, said indexing pin moves from a position aligned with said land to a position aligned with said groove to allow said locking pin to extend through said aperture in said cylindrical housing for engaging said pressurized cylinder to hold said rod in an extended position when said aperture is axially aligned with said rod in a position remote from said pressurized cylinder.

18. The strut as defined in claim 17 wherein said mounting bracket includes two lands spaced at 180° and two pin-receiving grooves spaced at 180° and positioned between said lands.

19. A releasable locking strut for mounting between a first member and a second member for holding said first member in spaced relationship to said second member until a predetermine force is applied between the first and second members said strut comprising:
- a cylinder including a rod extending therefrom;
- a cylindrical housing concentrically surrounding said cylinder and coupled to said rod for movement along the axis of said cylinder; and
- a lock extending between said cylindrical housing and said cylinder for holding said rod in a predetermined position with respect to said cylinder, said lock allowing said rod to move with respect to said cylinder when a predetermined force is applied to said rod in an axial direction,
- wherein said lock comprises a locking pin positioned to selectively engage one of said cylinder and rod for holding said rod in a predetermined position with respect to said cylinder,
- wherein said locking pin has an end facing said rod, which end has a reduced diameter such that it will shear when under a predetermined force.

20. The strut as defined in claim 19 wherein said locking pin is mounted between said cylindrical housing and said cylinder and is rotatable to a position for holding said locking pin in a retracted inoperative position.

21. The strut as defined in claim 20 wherein said locking pin includes a knob at an end opposite said reduced diameter end for rotating said locking pin with respect to said cylinder for selectively holding said locking pin in one of an operative and an inoperative position.

22. The strut as defined in claim 21 wherein said cylindrical housing includes an aperture adjacent one end thereof and further including a mounting bracket secured to said cylindrical housing in alignment with said aperture and wherein said locking pin is slideably positioned in said mounting bracket to selectively extend through said aperture to engage said cylinder for holding said rod in an extended position.

23. The strut as defined in claim 22 wherein said knob includes an indexing pin extending between said knob and said mounting bracket for selectively holding said locking pin away from said rod when in an inoperative position.

24. The strut as defined in claim 23 wherein said mounting bracket includes at least one land having a shoulder for holding said indexing pin in a position to maintain said locking pin in a retracted inoperative position.

25. The strut as defined in claim 24 wherein said mounting bracket includes a pin-receiving groove extending radially toward said cylindrical housing, wherein said groove is angularly offset from said land such that, as said knob is rotated, said indexing pin moves from a position aligned with said land to a position aligned with said groove to allow said locking pin to extend through said aperture in said cylindrical housing for engaging said cylinder to hold said rod in an extended position when said aperture is axially aligned with said rod in a position remote from said cylinder.

26. The strut as defined in claim 25 wherein said mounting bracket includes two lands spaced at 180° and two pin-receiving grooves spaced at 180° and positioned between said lands.

* * * * *

UNITED STATES PATENT AND TRADEMARK OFFICE
CERTIFICATE OF CORRECTION

PATENT NO. : 8,752,810 B2  Page 1 of 1
APPLICATION NO. : 13/297775
DATED : June 17, 2014
INVENTOR(S) : Anderson et al.

It is certified that error appears in the above-identified patent and that said Letters Patent is hereby corrected as shown below:

In the Claims

Column 5, line 39, "n" should be --pin--;

Column 5, line 50, "a" should be --5--;

Column 7, lines 4-5, after "members" insert --,--;

Column 7, line 14, "," should be --;--; and

Column 7, line 18, "," should be --;--.

Signed and Sealed this
Sixth Day of January, 2015

Michelle K. Lee
*Deputy Director of the United States Patent and Trademark Office*